Feb. 10, 1953 — H. I. POLTON — 2,627,672
EDUCATIONAL DEVICE
Filed April 17, 1950 — 2 SHEETS—SHEET 1
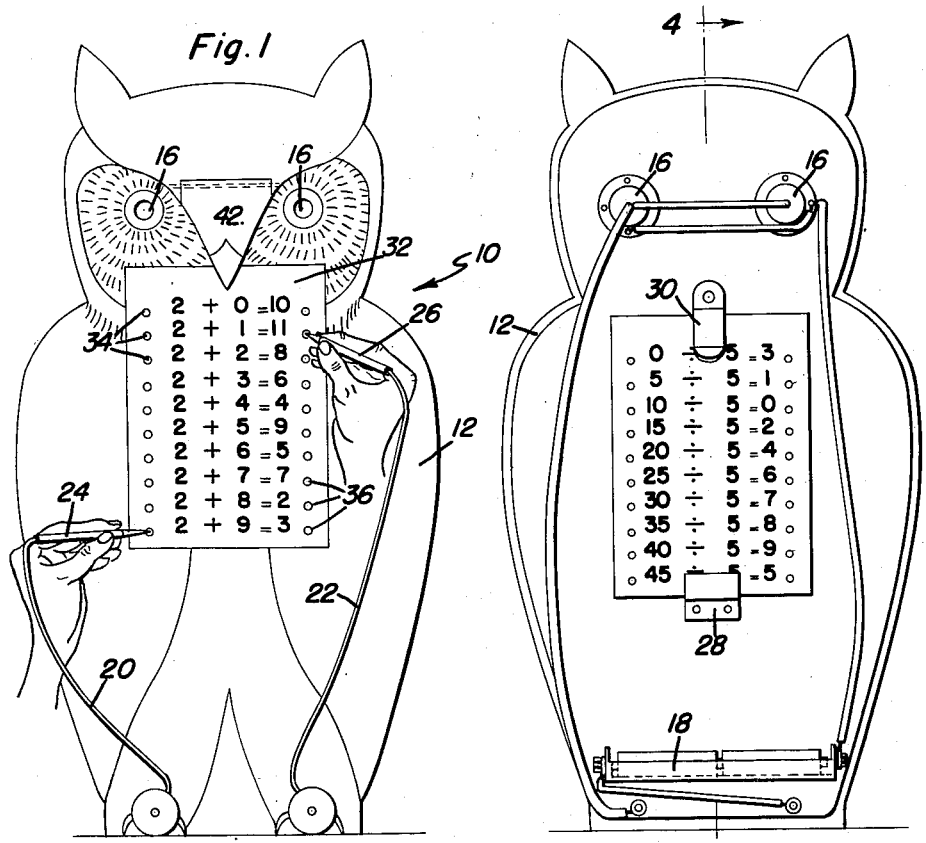
Fig. 1
Fig. 2
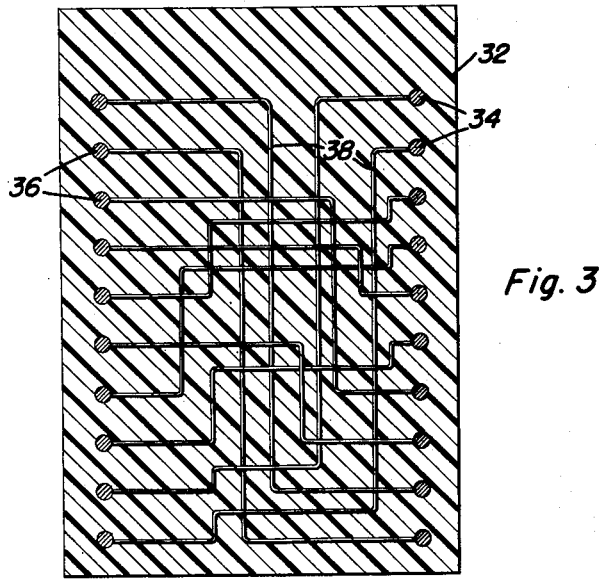
Fig. 3
Helen I. Polton
INVENTOR.

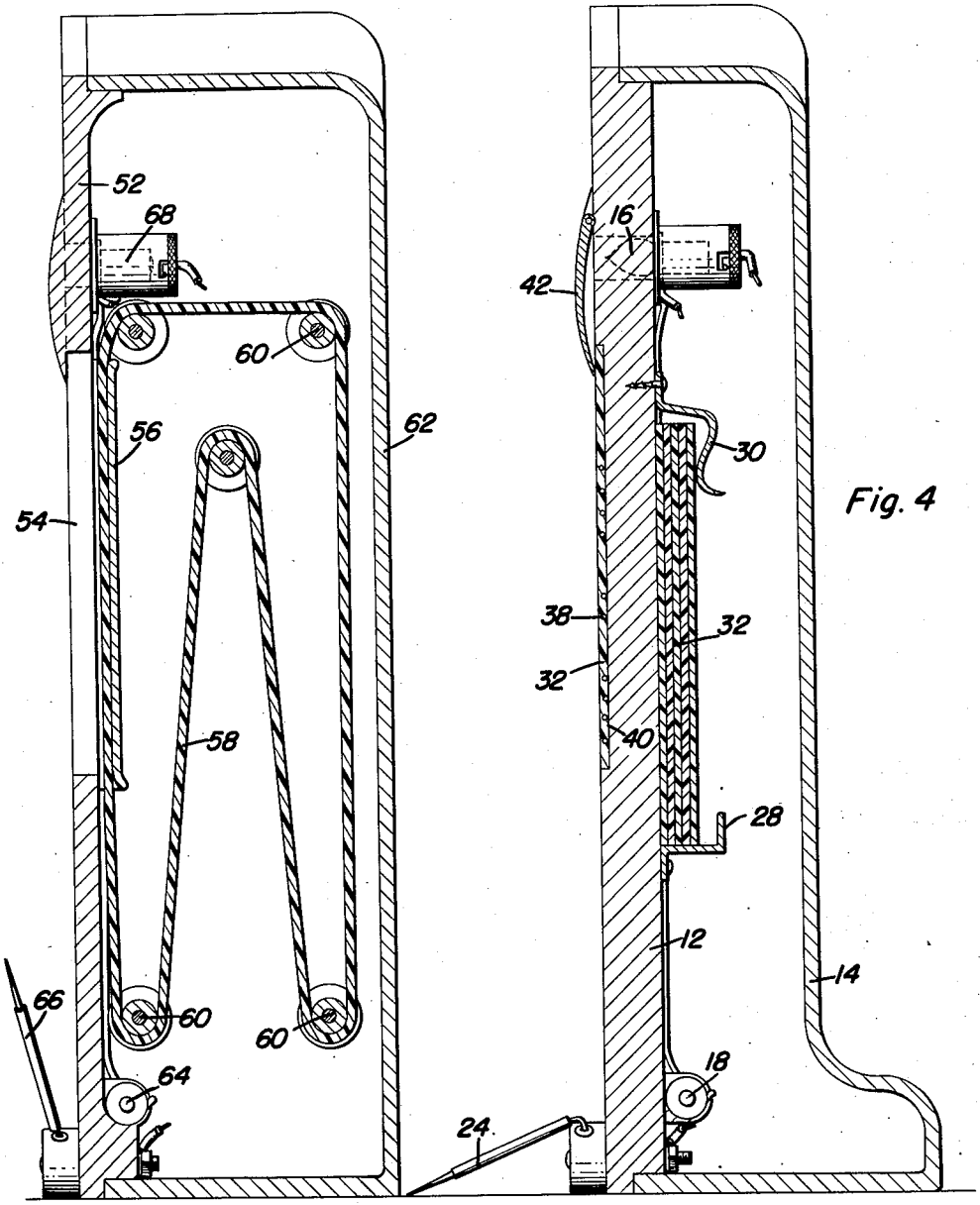

Patented Feb. 10, 1953

2,627,672

UNITED STATES PATENT OFFICE 2,627,672

EDUCATIONAL DEVICE

Helen I. Polton, Sinclair, Wyo., assignor of fifty per cent to W. Dean Polton, Laramie, Wyo.

Application April 17, 1950, Serial No. 156,267

2 Claims. (Cl. 35—9)

This invention relates to an educational device, and more particularly to a device that is particularly useful in teaching mathematics or other subjects to children in the lower grades of school.

An object of this invention is to provide an educational device that may be operated by the teacher and the pupil or may be operated by the pupil independently, which will be entertaining to a pupil, thus motivating study on drill material.

A further object of this invention resides in the provision of a highly attractive educational device which will provide means for checking answers to drill material by a pupil without supervision.

Still another object of this invention resides in the provision of an ornamental educational device which has an exterior configuration in the shape of an owl and which holds one of a plurality of cards singly by a spring clip which is in the form of the beak of an owl.

Yet another object of this invention is to provide a device which will use interchangeable cards or an endless row on which suitable questions and answers are printed and on which suitable contacts are secured, these contacts being interconnected by electrical conductors to complete operative electrical circuits between corresponding answers for given questions.

Still further objects of this invention reside in the provision of an educational device that is highly attractive and neat in appearance, simple in construction and manufacture, strong, durable, highly efficient in operation, and which may be used by pupils of very early age.

These, together with the various ancillary objects of the invention which will become apparent as the following description proceeds, are attained by this educational device, preferred embodiments of which have been illustrated in the accompanying drawings, by way of example only, wherein:

Figure 1 is a front elevational view of a first and preferred form of the device;

Figure 2 is a rear elevational view of the invention with the casing thereof being removed to show the structure of the invention in greater detail;

Figure 3 is a sectional view of one of the question and answer cards used in the invention;

Figure 4 is a vertical sectional view as taken along line 4—4 in Figure 2; and

Figure 5 is a vertical sectional view similar to that shown in Figure 4 of another and preferred form of the invention.

With continued reference to the accompanying drawings, wherein like reference numerals designate similar parts throughout the various views, reference numeral 10 generally designates a first form of the invention which includes an outer facing member 12 which is supported in an upright position by a suitable casing and stand 14. The facing member 12 has the configuration of an owl and is provided with signal lamps 16 in the eyes thereof which lamps are connected in parallel to one terminal of a source of power 18. While for home use it is preferable that batteries be used, obviously commercial power applied through a step-down transformer may be readily used. Connected to the other terminal of the battery 18 is a first conductor 20 and a second conductor 22 is connected with the other terminal of the signal lamp 16. Pointer contacts 24 and 26 are electrically connected and secured at the ends of the conductors 20 and 22. Thus, when an electrical-circuit is completed between the contacts 24 and 26, the current from the power supply 18 will be applied to the signal lamp 16.

On the inner surface of the facing member 12 there is attached a support 28 and a spring clip 30 for retaining a plurality of question and answer cards 32 which cards are provided with drill questions and answers thereon to cover mathematical problems, such as division, addition, subtraction, and the like, and upon which cards problems in other subjects may be used as well. Each of the cards 32 is provided with question contacts 34 and answer contacts 36 which are made of a conductive material. The question board 32 is made from a suitable insulative plastic material such as thermosetting resins and the like and has embedded therein a plurality of conductors 38 interconnecting the answers 36 corresponding to the questions 34.

Each of the cards 32 can be selectively emplaced in a recess 40 formed in the outer surface of the facing member 12. Holding the card 32 in place is a spring clip 42 formed in the shape of the nose of the owl. Hence, by first emplacing the pointer contact 24 in a given question, a pupil may determine whether his answer to the problem is right by placing the pointer 26 against one of the answer contacts 36.

Referring now to the form shown in Figure 5, it will be seen that the facing member 52 is provided with an aperture 54 and a guide track 56 through which an endless question and answer sheet 58 of the same characteristics as the sheets or cards 32 may pass. Suitable rollers 60 are rotatably mounted within the confines of the facing member 52 and the casing member 62, and the endless belt may therefore be moved from one position to another by mere upward or downward pressure on the endless roll 58 through the aperture 54. A suitable power supply source 64 is provided as are contact pointers 66 and signal lamps 68. This form of the invention operates in a manner identical to the device shown in Figures 1 through 4.

Since, from the foregoing, the construction and advantages of these forms of educational devices are readily apparent, further description is deemed to be unnecessary.

However, since numerous modifications will readily occur to those skilled in the art and since various changes in size, weight, scope and details of construction may be readily resorted to without departing from the principles of the invention, it is not intended to limit the invention to the precise embodiment shown and described, but all suitable modifications and equivalents may readily be resorted to which fall within the scope of the appended claims.

Having described the invention, what is claimed as new is:

1. An educational device comprising a casing, a facing member closing said casing, a signal device secured to the inner surface of said facing member, said facing member having apertures associated with said signal device, a source of electrical energy mounted in said casing, circuit means connecting one terminal of said source to one terminal of said signal means, control means for said circuit including a flexible conductor connected to the other terminal of said source, a second flexible conductor connected to the other terminal of said signal device, a recess in said facing member, a switch card mounted in said recess, a column of questions on said card, an electrical terminal associated with each of said questions, a column of answers on said card, an electrical terminal associated with each of said answers, the question terminals being electrically connected to the proper answer terminals, a pointer contact on each of said flexible conductors, said pointer contacts being engageable with said switch card terminals to energize said signal means.

2. An educational device comprising a facing member, a casing supporting said facing member, said facing member having the configuration of an owl, signal lamps mounted in the eyes of the owl, a source of potential for said lamps, circuit means operable to connect said source to said lamps, said facing member having a recess therein, a switch card mounted in said recess, a plurality of questions on said card, an electrical terminal on said card for each of said questions, answers to said questions on said card, an electrical terminal on said card for each answer, the question terminal being electrically connected within the card to the proper answer terminal, opposed terminals in said circuit means, a flexible conductor secured to each of said terminals, pointer contacts on said flexible conductors, said pointer contacts being engageable with said question and answer terminals, engagement of said pointer contacts with proper question and answer terminals bridging said opposed terminals and energizing said lamps.

HELEN I. POLTON.

REFERENCES CITED

The following references are of record in the file of this patent:

UNITED STATES PATENTS

| Number | Name | Date |
| --- | --- | --- |
| 1,860,895 | Marx | May 31, 1932 |
| 2,062,453 | Hastings | Dec. 1, 1936 |
| 2,198,894 | Werner | Apr. 30, 1940 |
| 2,200,206 | Myers | May 7, 1940 |